United States Patent Office 3,184,919
Patented May 25, 1965

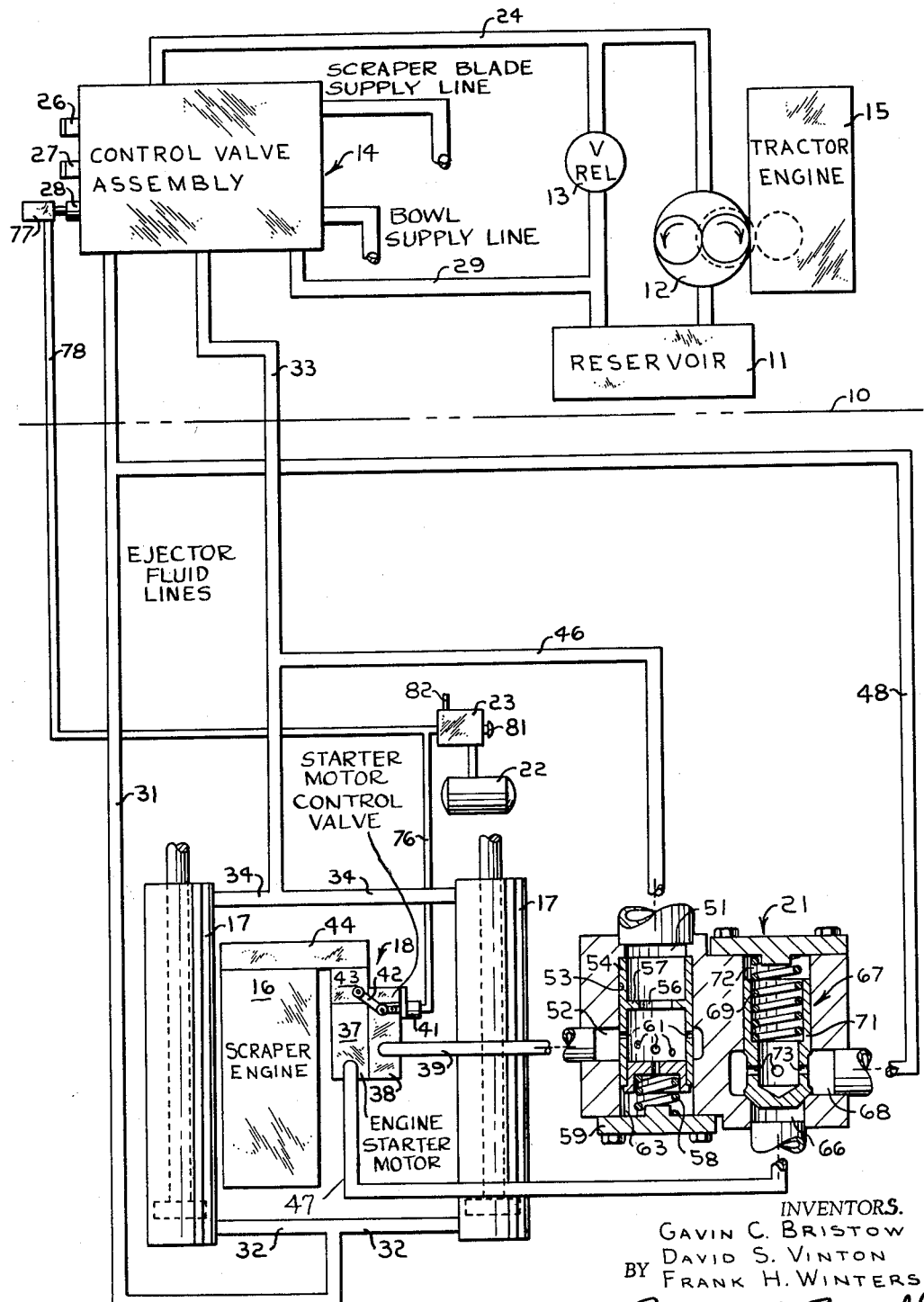

3,184,919
HYDRAULIC STARTING SYSTEM FOR ENGINES
David S. Vinton, Washington, and Gavin C. Bristow and Frank H. Winters, Joliet, Ill., assignors to Caterpillar Tractor Co., Peoria, Ill., a corporation of California
Filed June 18, 1962, Ser. No. 203,309
8 Claims. (Cl. 60—52)

The present invention relates to engine starting systems, and more particularly to a hydraulic starting system for an engine located on a vehicle which is normally drawn by a tractor (draft vehicle) or the like.

In large earth moving machines such as scrapers drawn by engine driven tractors, it is becoming increasingly common to provide an engine and power train for driving the drawn vehicle to substantially increase the tractive effort available for propelling the machine. Due to the complicated design of modern machines of this type, including the articulated connection and the location of the engine on the drawn machine at a point remote from the tractor, it has been impractical heretofore to utilize the power of the tractor engine or its starting mechanism as a means for starting the auxiliary engine. For this reason the presently known machines of this type have employed individual starting systems powered by energy stored in the form of electricity, compressed air or pressurized hydraulic fluid. The stored energy expended during starting of the engine is normally replaced by recharging devices in the form of generators, air compressors or hydraulic pumps which are driven by the drawn vehicle engine during normal operation of the machine. The disadvantages of such systems are that they are expensive, difficult to maintain and service, and limited in their ability to motor the engine repeatedly or over an extended period of time, such as during cold weather starting. It is thus desirable to provide a starting system for an engine employed on a vehicle of the type described above which makes available sufficient energy to allow motoring of the engine for extended periods of time and which do not require a recharging cycle.

Earth moving machines such as scrapers which have their own engines and drive systems are becoming of such great size and complexity as to require a high degree of skill and physical effort to operate. Thus an important factor in the design of auxiliary equipment for such machinery is the effort required by the operator in manipulating the equipment. Thus, the present invention provides a highly desirable substitute for known engine starting systems in that it not only possesses the physical characteristics described above but is also extremely simple to operate.

Accordingly, it is an object of the present invention to provide a starting system for the engine of a normally drawn vehicle wherein the system does not require recharging after being used.

It is a further object of the invention to provide a starting mechanism for the engine of a normally drawn vehicle which utilizes the hydraulic circuit for actuation of one of the vehicle components as a source of energy for driving the starter mechanism.

It is another object of the present invention to provide a hydraulic starting system for the engine of a normally drawn vehicle which has sufficient energy to enable the engine to be motored for a sustained period of time and which is easily operated so as to minimize the physical effort involved in utilization of the system.

Further and more specific objects and advantages of the invention are made apparent in the following specification wherein a preferred form of the invention is described by reference to the accompanying drawing.

The drawing is a schematic illustration of the various hydraulic components of a tractor and attached scraper with which the present invention is employed, for purposes of starting the scraper engine.

Almost all drawn vehicles which are equipped with auxiliary power plants employ some type of hydraulically actuated component which is supplied with hydraulic actuating fluid from a pump driven by the engine of the draft vehicle. Accompanying such components are hydraulic control means for directing the flow of hydraulic fluid from the pump to the component to be actuated. In this manner the operator, located on the tractor, can manipulate the components of the drawn vehicle in the manner necessary for performing the desired operations.

The present invention is described with reference to a tractor driven scraper which has its own engine. Scrapers normally have three hydraulically actuated components, one of which is an ejector operated by one or more hydraulically actuated jacks. While the invention will be described as operating in connection with the hydraulic circuit which drives the ejector, it is to be understood that the hydraulically actuated bowl and apron of the scraper have associated hydraulic systems sufficiently similar to that of the ejector to enable the invention to be sucessfully operated in conjunction therewith just as well. Further it is to be understood that the present invention has general application with hydraulic systems which drive the components of a drawn vehicle which has its own engine.

Except for a single valve, the other components of the hydraulic system shown in the drawing are simply in block form. This has been done to minimize the complexity of the drawing and to eliminate the details of components which are well known in the art and which can be any of several known devices capable of performing the desired function. The particular hydraulic system with which the present invention is illustrated is shown in great detail and fully explained in assignee's copending application entitled, "Hydraulic Circuit for Actuation of an Earth Moving Scraper Ejector," filed March 15, 1962, Serial No. 182,154, now Patent No. 3,138,884.

The drawing is divided into two sections by a broken line 10 for the purposes of indicating those components which reside on the tractor from those which reside on the scraper. The components above line 10 which include an engine 15, reservoir 11, a pump 12, a relief valve 13, and a control valve assembly 14 are all components which are mounted on the tractor. The components below line 10 are mounted on the scraper and include an engine 16, a pair of ejector jacks 17 on either side of the engine, an engine starting assembly 18, a flow control valve 21, a compressed air storage tank 22, and an air valve 23.

When the engine 15 of the tractor is operating, pump 12 is driven by the engine and draws hydraulic fluid from reservoir 11 and delivers it through line 24 to control valve assembly 14. Control valve assembly 14 has three selector elements 26, 27 and 28 which are operated to direct fluid to either the scraper apron, bowl or ejector, respectively. Each of the control valve selectors has three positions; in the neutral position it is ineffectual as far as directing fluid to the scraper hydraulic system, in a first active position it directs fluid so as to position its associated scraper component in one direction, while in a second active position it directs fluid so as to position its associated scraper component in the other direction. Thus, when all of the selectors are in their neutral positions the hydraulic fluid delivered through line 24 is simply returned to the reservoir 11 by means of line 29. Relief valve 13 is situated between line 24 and the juncture of line 29 with reservoir 11 and serves to prevent an excessive build up of pressure by bleeding off a portion of the pressure delivered by the pump when a predetermined pressure limit has been reached.

When selector 28 is moved to one of its active positions, pump 12 is communicated with line 31 so that hydraulic fluid is delivered to the head end of jacks 17 for the purpose of moving the scraper ejector (not shown) forwardly of the scraper to eject its contents. When selector 28 is in its other active position, pump 12 is communicated with line 33 which directs fluid to the rod end of jacks 17 through line 34.

Hydraulic starting motor assembly 18 comprises a hydraulically driven starting motor 37 of conventional design, a starting motor control valve 38, the details of which are not necessary for an understanding of the invention other than that it operates to either form a communication between motor 37 and a hydraulic conduit 39 or prevent communication therebetween depending upon the performance desired. The starting system also includes an air cylinder 41 with a piston (not shown) to act on linkage 42 when pressurized air is received by the cylinder. When linkage 42 is acted upon starter drive mechanism 43 engages engine flywheel 44 and thereby provides connection between motor 37 and engine 16 and valve 38 is opened.

To start the engine 16, control valve assembly selector 28 is put in the same active position which corresponds to retracting the jacks 17 of the scraper ejector. This causes the hydraulic fluid from pump 12 to pass into line 33, and if the ejector is not in its fully retracted position (the position it should be in when starting engine 16) the fluid from line 34 will enter the rod end of jacks 17 and cause the jacks to retract. With the jacks retracted, fluid will be diverted through a branch line 46 which leads to flow control valve 21, the output of which connects with line 39 to hydraulic starting motor 37. The fluid is passed through motor 37 causing it to turn flywheel 44 and start engine 16 and returns through line 47 to flow control valve 21 from which it emerges to a line 48 leading to line 31 and back to reservoir 11 through control valve assembly 14. In this manner a complete hydraulic circuit is established which includes the starting motor 37 and provides means for starting engine 16. The system is seen to have all of the necessary energy to motor the engine for a substantial period of time and not require any type of subsequent recharging.

Since the hydraulic fluid which flows to starting motor 37 through line 46 is the same relatively large quantity necessary to retract the ejector, motor 37 would be driven at a speed much in excess of that necessary for starting engine 16 unless an appropriate flow control valve were disposed between the motor and line 46. Thus, flow control valve 21 receives the hydraulic fluid from line 46 at its input 51 and delivers fluid at a flow rate commensurate with the needs of motor 37 from output 52. Valve 21 includes a valve bore 53 and a valve member 54 slidably retained therein. Valve member 54 has a central restricted orifice 56 formed by annular web member 57, and a plurality of orifices 61 leading to output 52. A valve spring 58 seats on a cover member 59 and resiliently urges valve member 54 upwardly. When pump 12 supplies fluid at a given pressure to line 46 the flow through orifice 56 will be determined by size of orifice 56. As long as the flow through orifice 56 is at a rate which drives motor 37 at the desired speed, all of orifices 61 will communicate with output 52. Should the pressure rise in line 46, however, causing an increase in flow through orifice 56, valve member 54 would move downward against the spring 58 and one or more of orifices 61 would be blocked from output 52. In this manner the flow through output 52 is maintained reasonably constant at a desired level.

The output from motor 37 also flows through flow control valve 21 before returning through line 48 to reservoir 11. Line 47 is connected to the input 66 of a check valve 67 which has its output 68 connected to line 48. Since line 48 connects into line 31 it is necessary to have a check valve between lines 48 and 47 to prevent the motor 37 from being driven in reverse when the ejector is being extended. Check valve 67 has a biasing spring 69 which urges a valve plunger 71 against the output 66. When pressure builds up in line 47, however, spring 69 is overcome and valve plunger 71 is urged upwardly forming communication between input 66 and output 68 thus enabling the output fluid to reach reservoir 11. When fluid attempts to pass from line 48 to line 47 through check valve 67, however, the fluid enters the spring chamber 72 through a plurality of ports 73 in the valve plunger and aids the spring in closing the valve. Bores 73 prevent hydraulic lock of the check valve which would occur if fluid were trapped in the spring chamber.

Thus, to start the engine 16 it is necessary to first start the tractor engine 15 so as to build up a source of hydraulic pressure. It is then necessary to properly position selector 28, open valve 38, and engage starter drive mechanism 43. If selector 28 is positioned to provide hydraulic fluid to line 46 before valve 38 is opened there will be an undesirable build up of pressure throughout the system. If selector 28 is positioned to provide fluid to line 46 before drive mechanism 43 is engaged the engagement thereof will become very difficult since it will be rotating due to the activation of motor 37. If the operator must make the adjustment to valve 38 and mechanism 43 before adjusting selector 28 it requires that he start the tractor engine, then go all the way back to the rear of the scraper where the controls are mounted and set valve 38 and mechanism 43, and then return to the tractor where the selector 28 is mounted.

The present invention provides a means whereby the operator of the draft vehicle can make all of the adjustments necessary from a single position, thereby eliminating a great deal of effort on his part. For this purpose air tank 22 is provided and supplied with a quantity of compressed air. Tank 22 communicates through air valve 23 to air cylinder 41 via line 76 and with an air cylinder 77 via line 78. Air cylinder 77 is connected to selector 28 on control valve assembly 14 such that air provided in the cylinder moves selector 28 in the direction to effect retraction of jacks 17. When air is received in cylinder 41 from line 76, linkage 42 is driven to a position which opens valve 38 forming communication between line 39 from valve 21 and motor 37, and also engages mechanism 43 to flywheel 44 so as to form a driving connection between motor 37 and engine 16. Thus once the tractor engine is running the operator is required only to position handle 81 of valve 23 such that communication is formed between compressed air tank 22 and lines 76 and 78. This single operation provides hydraulic fluid to and conditions the hydraulic starting system for operation. When the engine 16 has been started, a repositioning of handle 81 disconnects tank 22 from lines 76 and 78 and communicates it with an exhaust port 82 which bleeds the air pressure from lines 76 and 78 and allows selector 28 to thereby be repositioned to neutral by means of a biasing spring or the like and which also enables valve 38 and mechanism 43 to return to their normal positions by similar means. It is to be noted that only a small amount of air pressure is required to make and maintain these adjustments so that the air tank 22 may be used to start engine 16 several times before requiring a new supply of air. Additionally air tank 22 is re-charged during the starting operation from a compressor driven by the tractor engine 15.

The present invention provides a starting system for an engine on a normally drawn vehicle wherein the starting system is hydraulically driven by a pump from the tractor but does so without requiring that an additional heavy hydraulic line be placed between the two articulated vehicles. While the embodiment as shown in the drawing does require a line to be placed between the tractor and the scraper, namely line 78, it is only a pneumatic line which may be quite small and flexible as compared to a hydraulic line. The system has exceptional dependability due to its simplicity, and through appropriate valving insures that the starting motor operate at a desired speed.

We claim:
1. In a hydraulic starting system for an engine of vehicle normally drawn by an engine driven draft vehicle, wherein the drawn vehicle has a hydraulically actuated component which is supplied with actuating fluid from a pump driven by the propulsion engine of the draft vehicle, the combination comprising: a hydraulically driven starting motor mechanically connectable to the engine of the drawn vehicle; and a fluid conduit connecting said starting motor to the engine driven pump wherein the portion of said conduit from the pump to the drawn vehicle is the same conduit used to supply fluid to the hydraulically actuated component of the drawn vehicle.

2. In a hydraulic starting system for an engine of a vehicle normally drawn by an engine driven draft vehicle, wherein the drawn vehicle has a hydraulically actuated component and the component receives actuating fluid through a supply conduit connected to the discharge of a pump driven by the propulsion engine of the draft vehicle, the combination comprising: a hydraulically driven starting motor mechanically connected to the engine of the drawn vehicle such that operation of said motor is effective in motoring the engine to which it is connected; a first fluid conduit connecting the input to said motor to the supply conduit to the component; and a second fluid conduit connecting the output of said motor to a reservoir.

3. The hydraulic starting system of claim 2 further comprising a flow control valve hydraulically connected in said first fluid conduit between the supply conduit and said starting motor, said flow control valve maintaining the fluid flow to said motor within a set maximum value.

4. The hydraulic starting system of claim 3 further comprising a motor control valve hydraulically connected in said first fluid conduit between said flow control valve and said starting motor, said valve being conditioned to pass fluid when operation of said starting motor is desired, and conditioned to prevent fluid flow to said motor when not starting the engine of the normally drawn vehicle; a drive mechanism between said motor and the engine of the drawn vehicle, said mechanism connecting said motor to engine during a starting operation and disconnecting the motor therefrom at all other times; means for conditioning said second fluid conduit as a second supply conduit and a check valve between the output of said motor and said second fluid conduit to prevent fluid from driving said motor in reverse.

5. In a hydraulic starting system for an engine of a vehicle normally drawn by an engine driven draft vehicle, wherein the drawn vehicle has a hydraulically actuated component, and the component receives actuating fluid through a supply conduit which is connected to a selector valve on the draft vehicle, wherein the selector valve is supplied with fluid from a pump which is driven by the propulsion engine of the draft vehicle, the combination comprising: a hydraulically driven starting motor on the normally drawn vehicle; drive means selectively connecting said motor to the engine of the drawn vehicle such that operation of said motor turns the engine; a conduit hydraulically connecting said motor to the supply conduit; valve positioning means selectively conditioning the selector valve to communicate the pump with the supply conduit; and initiating means connected to said drive means and said valve positioning means, operable to manipulate said two means from a single location.

6. The hydraulic starting system of claim 5 further comprising a motor control valve hydraulically disposed between said motor and said conduit, said valve being selectively operable to effectively disconnect said motor from said conduit or form communication therebetween, said initiating means also being connected to said control valve and operable to manipulate it.

7. The hydraulic starting system of claim 5 wherein said initiating means comprises a pressurized air tank; a pneumatic valve connected between said tank and said drive means and said valve positioning means, wherein said pneumatic valve has one position wherein said tank supplies air to said means and thereby manipulates them to a communicating position and another position where said tank is disconnected from said means and said means are connected to an exhaust port which relieves the pressure from said means allowing them to return to their noncommunicating positions.

8. The hydraulic starting system of claim 5 further comprising a flow control valve hydraulically connected between said motor and said conduit, said valve operative to prevent the flow of actuating fluid to said motor from exceeding a set maximum value.

References Cited by the Examiner
UNITED STATES PATENTS

| | | | |
|---|---|---|---|
| 2,347,882 | 5/44 | Choate et al. | 37—126 |
| 2,970,440 | 2/61 | Dmitroff et al. | |
| 3,027,704 | 4/62 | Dmitroff | 60—17 |
| 3,068,596 | 12/62 | Hein et al. | 37—129 |

JULIUS E. WEST, *Primary Examiner.*